United States Patent [19]
Hoyle et al.

[11] Patent Number: 5,452,919
[45] Date of Patent: Sep. 26, 1995

[54] SUSPENSION SYSTEM FOR A VEHICLE

[75] Inventors: Christopher S. Hoyle, Morton Morrell; Mark Pask, Bromsgrove; Richard G. Woodhouse, Hall Green; Martin J. Davis, Tamworth; Michael J. Booth, Hanslope, all of England

[73] Assignee: Rover Group Limited, England

[21] Appl. No.: 80,328

[22] Filed: Jun. 22, 1993

[30] Foreign Application Priority Data

Jun. 23, 1992 [GB] United Kingdom ............ 9213268

[51] Int. Cl.⁶ .................................... B60S 9/00
[52] U.S. Cl. .................. 280/840; 280/704; 280/707; 364/424.05
[58] Field of Search ............... 280/707, 840, 280/DIG. 1, 704; 364/424.05

[56] References Cited

U.S. PATENT DOCUMENTS

| | | | |
|---|---|---|---|
| 4,903,209 | 2/1990 | Kaneko | 364/424.05 |
| 4,965,878 | 10/1990 | Yamagiwa et al. | |
| 5,072,965 | 12/1991 | Wada et al. | 280/707 |
| 5,193,849 | 3/1993 | Holzmann | 280/840 |
| 5,276,621 | 1/1994 | Henry et al. | 364/424.05 |

FOREIGN PATENT DOCUMENTS

| | | |
|---|---|---|
| 0241592 | 10/1987 | European Pat. Off. . |
| 0297736 | 1/1989 | European Pat. Off. . |
| 0398158 | 11/1990 | European Pat. Off. . |
| 58-126207 | 7/1983 | Japan . |
| 61-036007 | 2/1986 | Japan . |
| 61-184110 | 8/1986 | Japan . |
| 62-122810 | 6/1987 | Japan . |
| 1233111 | 9/1989 | Japan . |
| 2057415 | 2/1990 | Japan . |
| 804410 | 11/1958 | United Kingdom . |
| 956136 | 4/1964 | United Kingdom . |
| 985629 | 3/1965 | United Kingdom . |
| 1551769 | 8/1979 | United Kingdom . |
| 2237780 | 5/1991 | United Kingdom . |
| 91/07291 | 5/1991 | WIPO . |

Primary Examiner—Kenneth R. Rice
Attorney, Agent, or Firm—Davis, Bujold & Streck

[57] ABSTRACT

A vehicle air suspension can be controlled between a Standard setting of ride height and a lower, Kneel, setting. Movement to or from the Kneel setting is frozen if a door is opened or if the footbrake is applied. Alteration to the Kneel setting is prevented except when the vehicle is stationary. The suspension reverts to the Standard ride height if the vehicle is driven off or the handbrake is released. Movement of the suspension to or from a lower or higher setting is carried out sequentially to prevent headlamp dazzle. If the vehicle becomes partly supported by direct contact between the chassis and the ground (belly-out) this is detected by monitoring signals to ride height control valves and by providing a controlled re-inflation and balancing of the air springs.

18 Claims, 3 Drawing Sheets

SUSPENSION SYSTEM FOR A VEHICLE

The invention relates to suspension systems for vehicles. In particular it relates to a suspension system for a vehicle having front wheels and rear wheels, the suspension system being of the kind which comprises front suspension units for supporting vehicle weight on the front wheels and rear suspension units for supporting vehicle weight on the rear wheels, the suspension units being operative to adjust the ride height between sprung and unsprung parts of the vehicle, and control means operatively connected to the suspension units for maintaining the ride height at a particular setting.

Suspension systems of the kind referred to commonly use air or gas as the suspension medium with air or liquid being admitted to or released from the suspension units to provide the adjustment of ride height.

Whilst it is known, for example from WO91/06440, to provide control means for manually selecting a ride height in a suspension system of the kind referred to, this prior art specification, along with others, is mostly concerned with the provision of such control means in goods carrying vehicles. Other prior art, for example GB-A-1551769, is mainly concerned with large passenger carrying vehicles such as omnibuses.

It is an object of the present invention to provide a suspension system which is particularly suitable for smaller passenger carrying vehicles such as autombiles and sports utility vehicles.

According to a first aspect of the invention there is provided a suspension system of the kind referred to wherein the control means is operative to maintain the ride height at a first, Standard, setting for normal driving on a road and driver operable selector means are provided for varying operation of the control means to alter the ride height to a second, Kneel, setting below the Standard setting, the control means being responsive to a door open signal indicative of the opening of an outwardly opening door of the vehicle to interrupt alteration of the ride height to or from the Kneel setting when the door is opened.

The Kneel setting provides for easy entry of the driver, passengers and goods and movement to the Kneel setting is interrupted to prevent damage to the vehicle and the occupants if a door is inadvertantly opened.

Preferably the control means is responsive to a road speed signal indicative of the speed of the vehicle to prevent alteration of the ride height to the Kneel setting in response to a driver's selector signal except when the vehicle is stationary. This helps to prevent damage to the vehicle resulting from travelling with a reduced ground clearance.

The control means may be responsive to a park signal indicative that a parking device of the vehicle is applied to prevent alteration of the ride height to the Kneel setting in response to a driver's selector signal except when the parking device is applied, in which case the control means may be operative to restore the ride height to the Standard setting in response to the absence of the park signal indicating that the parking device is released.

Conveniently the control means is responsive to a footbrake on signal indicative that a footbrake on the vehicle is applied to prevent alteration of the ride height to the Kneel setting except when the footbrake is not applied.

Furthermore the control means may be responsive to an engine off signal indicative that the engine of the vehicle is not running to prevent alteration of the ride height to the Kneel setting except when the engine is running, in which case the control means may be operative to permit alteration of the ride height to the Kneel setting for a predetermined time after the engine has been switched off.

Preferably the control means is operative to restore the ride height to the Standard setting in response to a road speed signal indicating vehicle movement following operation of the selector means to select the Kneel setting.

Conveniently the control means is operative to adjust the ride height from the Kneel setting to the Standard setting at the rear suspension units before adjusting at the front suspension units and to adjust from the Standard setting to the Kneel setting at the front suspension units before adjusting at the rear suspension units.

According to a second aspect of the invention there is provided a suspension system of the kind referred to wherein the control means is operative to maintain the ride height at a first, lower, setting or at a second, higher, setting above the first setting, in response to vehicle parameters or driver command, the control means also being operative to adjust the ride height from the lower setting to the higher setting at the rear suspension units before adjusting at the front suspension units and to adjust from the higher setting to the lower setting at the front suspension units before adjusting at the rear suspension units.

Preferably the control means is operative to adjust the ride height to a first intermediate setting between the lower setting and the higher setting when adjusting the ride height from the lower setting to the higher setting and to a second intermediate setting between the higher setting and the lower setting when adjusting the ride height from the higher setting to the lower setting. In this case the control means may be operative to adjust the ride height from the first intermediate setting to the higher setting at the rear suspension units before adjusting at the front suspension units and to adjust from the second intermediate setting to the lower setting at the front suspension units before adjusting at the rear suspension units.

Conveniently the control means is adapted to provide for each suspension unit a respective up signal tending to increase the ride height and a respective down signal tending to reduce the ride height and arranged so that if a down signal exists for more than a predetermined time indicative that the vehicle is supported by means other than the road wheels the down signal is ceased.

According to a third aspect of the invention there is provided a suspension system for a vehicle having front wheels and rear wheels, the suspension system comprising front suspension units for supporting vehicle weight on the front wheels and rear suspension units for supporting vehicle weight on the rear wheels, each suspension unit being operative to adjust the ride height between sprung and unsprung parts of the vehicle adjacent to each suspension unit, and control means operatively connected to the suspension units for maintaining each ride height at a particular setting, the control means being adapted to provide for each suspension unit a respective up signal tending to increase the ride height and a respective down signal tending to reduce the ride height and arranged so that if a down signal exists for more than a predetermined time indicative that the vehicle is supported by means other than the road wheels the down signal is ceased.

Preferably the control means is arranged to provide an up signal following cessation of the down signal, said up signal tending to increase the ride height at the suspension unit associated with the lowest ride height, in which case the control means may be arranged to provide the up signal for a fixed period following cessation of the down signal.

Where the suspension units use fluid pressure to support the vehicle the control means is conveniently arranged to momentarily interconnect the suspension units in a predetermined sequence to balance pressures following the readmittance of fluid to the suspension unit associated with the lowest ride height. In this case the predetermined sequence may comprise the steps of momentarily interconnecting the front suspension units, momentarily interconnecting the rear suspension units, momentarily interconnecting a front suspension unit on one side of the vehicle and a rear suspension unit on the other side of the vehicle and momentarily interconnecting a front suspension unit on said other side of the vehicle with a rear suspension unit on said one side of the vehicle.

Preferably the suspension system further comprises driver operable selector means for providing a driver's selector signal for varying operation of the control means, wherein the control means is arranged so that, following interconnection of the suspension units in said predetermined sequence, up and down signals are inhibited until a driver's selector signal is received.

Conveniently the control means is responsive to a road speed signal indicative of the speed of the vehicle and, following interconnection of the suspension units in said predetermined sequence, is operative to inhibit up and down signals until the road speed signal indicates that a predetermined road speed is attained.

Preferably the control means is arranged so that, following interconnection of the suspension units in said predetermined sequence, up and down signals are inhibited until a predetermined time has elapsed.

The invention also provides a motor vehicle incorporating a suspension system according to any preceding aspect of the invention.

Other aspects of the invention will be apparent from the appended claims and from the following description of the invention which is given by way of example and with reference to the accompanying drawings, of which:

Figure 1:
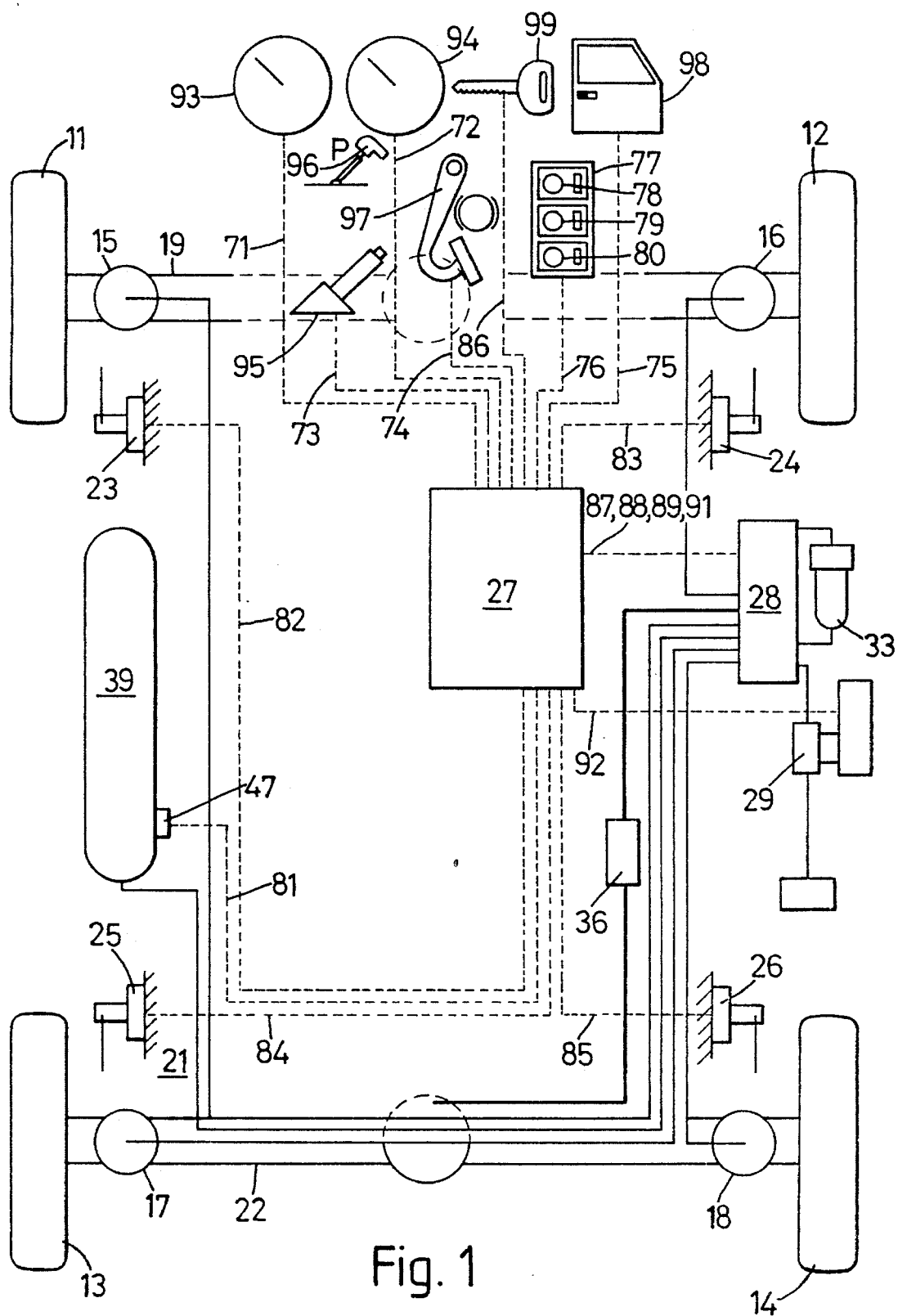
FIG. 1 is a schematic view of one example of a suspension system according to the invention.

Referring to the drawings, a vehicle includes front wheels 11 and 12 and rear wheels 13 and 14 which support the weight of the vehicle on suspension units, 15 and 16 at the front, 17 and 18 at the rear. The front wheels 11 and 12 are carried on a front, rigid, driving axle 19 which represents an unsprung part of the vehicle, the front suspension units 15 and 16 each acting between the front axle 19 and the vehicle chassis, shown diagrammatically at 21.

The rear wheels 13 and 14 are carried on a rear, rigid, driving axle 22 which also represents an unsprung part of the vehicle, the rear suspension units 17 and 18 each acting between the rear axle 22 and the vehicle chassis 21.

Each suspension unit 15, 16, 17 and 18 is a rolling diaphragm air spring of generally known type. Mounted close to each air spring is a link to an arm of a respective rotary potentiometer 23, 24, 25 and 26 which acts as a travel transducer to give a ride height signal indicative of the ride height between the sprung and unsprung parts of the vehicle represented by the chassis 21 and the axles 19 and 22.

The ride height can be adjusted or maintained at a particular setting by a control means comprising an electronic control unit (ECU) 27 which is connected to a valve block 28 to control the admission of air to each air spring 15, 16, 17 and 18 from a reservoir 39 supplied by an electric motor driven compressor 29 and the release of air from the air springs to atmosphere.

Figure 2:
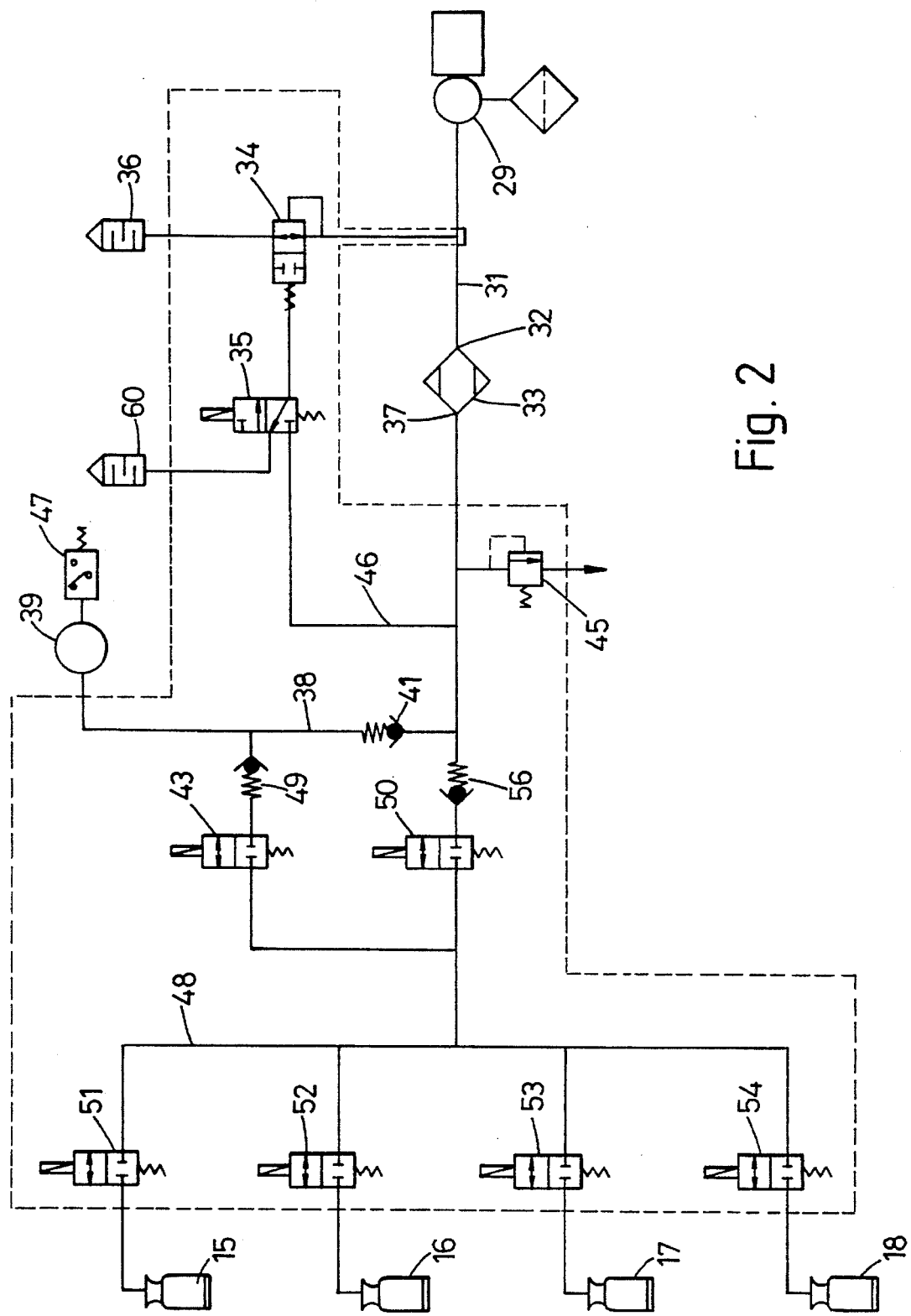
FIG. 2 is a diagram showing in more detail the interconnection of air operated components of the system shown in FIG. 1.
Figure 3:
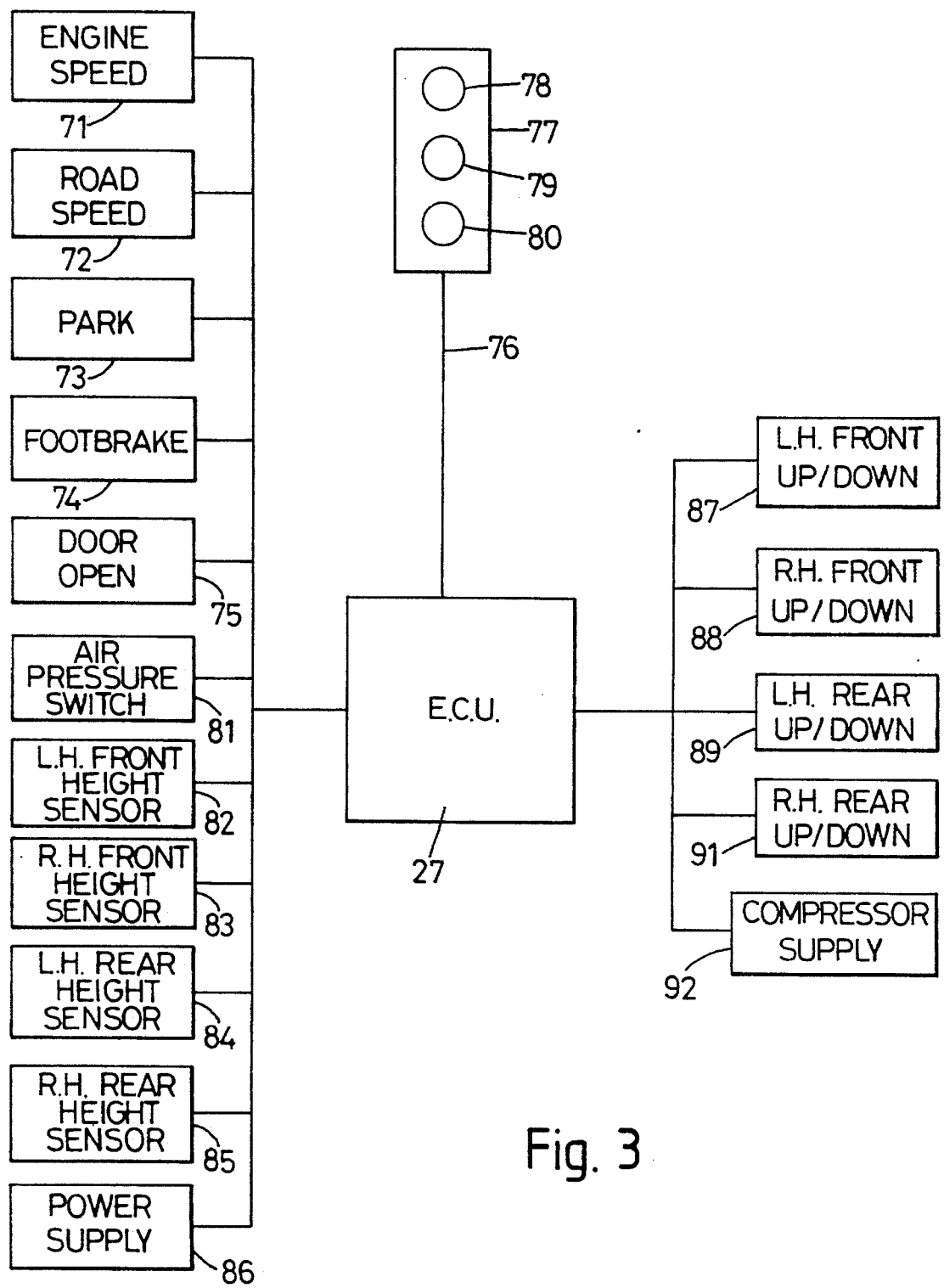
FIG. 3 is a diagram showing the connections to an electronic control unit shown in FIG. 1.

As can be seen in FIG. 2, the compressor 29 is connected by line 31 to an inlet (conveniently called the wet inlet) 32 of a dryer 33. The wet inlet 32 is also connected through an exhaust valve 34 to an exhaust silencer 36. The exhaust valve 34 is pilot operated by a solenoid pilot valve 35.

The other inlet (conveniently called the dry inlet) 37 of the dryer 33 is connected by line 38 to the reservoir 39 through a non-return valve 41. A pressure switch 47 is connected to the reservoir 39. The dry inlet 37 is also connected to a pressure relief valve 45 and by a line 46 to the solenoid pilot valve 35.

A solenoid-controlled inlet valve 43 serves to selectively connect the reservoir 39 to a line 48 through a non-return valve 49. Line 48 is connected to each of the air springs 15, 16, 17 and 18 through a respective solenoid-controlled ride height valve 51, 52, 53 and 54.

A solenoid-controlled release valve 50 connects the ride height valves 51, 52, 53 and 54 to atmosphere through a non-return valve 56, the dryer 33 and the exhaust valve 34.

The inlet valve 43, the release valve 50 and the ride height valves 51, 52, 53, 54 are arranged so that when each solenoid is de-energised the respective valve is closed and when each solenoid is energised the respective valve is opened. When de-energised, the solenoid pilot valve 35 connects one side of a pressure operated actuating member (eg. a diaphragm) in the exhaust valve 34 to atmosphere through another silencer 60. When energised, the solenoid pilot valve 35 connects the same side of the exhaust valve actuating member to the dryer dry inlet 37. The other side of the exhaust valve actuating member is connected to the line 31 from the compressor 29. The actuating member is spring biased so that the exhaust valve 34 can normally remain closed but is openable against the biasing spring load by pressure in line 31. This opening is inhibited by the solenoid pilot valve 35 as will be described later.

The connections into the ECU 27 include the following inputs:

Engine Speed Signal 71; a signal is obtained from one of the current windings of an engine driven alternator, but other convenient measurements of engine speed may be used. FIG. 1 shows this diagrammatically as a connection to an engine speed (RPM) indicator or rev counter 93.

Road Speed Signal 72; a signal representative of road speed is obtained from an inductive transducer in the vehicle's transmission. FIG. 1 shows this diagrammatically as a connection to an road speed indicator or speedometer 94.

Park Signal 73; a signal indicating that a parking device has been applied is obtained from the parking brake 95 or from a microswitch in an automatic transmission which operates when the transmission is in the Park position (a selector lever is shown diagrammatically at 96 in FIG. 1). The microswitch is conveniently the same switch as is used to prevent the vehicle's engine from being started unless the transmission is in the Park position.

Footbrake Signal 74; a signal indicating that the footbrake or service brake has been applied is conveniently obtained from the vehicle's stoplight switch (a footbrake pedal and a brake symbol are shown diagrammatically at 97 in FIG. 1).

Door Open Signal 75; a signal indicating that an outward-opening door is open is obtained from the vehicle interior light circuit which includes a microswitch operable by each side passenger door (a door is shown diagrammatically at 98 in FIG. 1).

Driver's Selector Signal 76; a driver operable selector means in the form of a selector switch unit 77 (FIG. 1) has three push-button switches 78, 79 and 80. Switch 78 is termed the up switch and is non-latching. Switch 79 is termed the inhibit switch and is latching whilst switch 80 is termed the down switch and is non-latching.

Air Pressure Switch Signal 81; this is obtained from the pressure switch 47.

Height Sensor Signals 82, 83, 84 and 85; these are obtained from the Left Hand Front, the Right Hand Front, the Left Hand Rear and the Right Hand Rear rotary potentiometers 23, 24, 25 and 26 respectively.

Power Supply 86; the power supply to the ECU is controlled through a relay and, although indicated diagrammatically at 99 in FIG. 1 by an engine ignition key, is controlled under certain conditions which will be described later.

The connections into the ECU 27 include the following outputs:

Up/Down Signals 87, 88, 89 and 91; these connect to the ride height valves 51, 52, 53 and 54 respectively and to the inlet valve 43 or the release valve 50 as appropriate and as will be described below.

Compressor Supply Signal 92; this is connected to the compressor 29 and to the solenoid pilot valve 35 through a relay (not shown).

In use the ECU 27 controls the height of the vehicle, as perceived by the rotary potentiometers 23, 24, 25 and 26, by monitoring each of the height sensor signals 87, 88, 89 and 91 periodically (every 10 milliseconds). If there is any deviation from a datum after 12 seconds the ECU 27 causes the entry or release of air to or from the respective air spring 15, 16, 17 or 18 until the datum is regained.

Entry of release or air to or from an air spring 15, 16, 17 or 18 is effected by the ECU 27 supplying an Up/Down signal 87, 88, 89 or 91 to the respective ride height valve 51, 52, 53 or 54 and to the inlet valve 43 or the release valve 50 according to whether air is to be admitted or released. An Up/Down signal 87, 88, 89 or 91 causing operation of the inlet valve 43 is referred to as an Up signal whereas an Up/Down signal causing operation of the release valve 50 is referred to as a Down signal.

For the rear suspension, the ECU controls the ride height to the required datum by adjusting the air in each rear air spring 17 or 18. For the front suspension, the ECU compares the average of the height sensor signals 87 and 88 from the front travel transducers with the required datum and adjusts air to whichever spring 15 or 16 requires adjustment (or to both air springs if both height sensor signals deviate from the datum to an appreciable extent). At the end of an adjustment to one or both front air springs 15 or 16, both front ride height valves 51 and 52 are opened momentarily to equalise the pressures in the front springs, the inlet valve 43, the release valve 50 and the rear ride height valves 53 and 54 all being closed.

The compressor 29 is switched on or off by the compressor supply signal 92 to maintain a pressure in the reservoir 39 according to limits set by the air pressure switch signal 81. When energised by the compressor supply signal 92, the solenoid pilot valve 35 inhibits operation of the exhaust valve 34 by balancing pressures across the exhaust valve operating member and thus keeping the exhaust valve closed.

The dryer 33 is a regenerative device using silica gel or other suitable moisture-absorbing material which is arranged so that dry air expelled through the release valve 50 passes through the dryer from the dry inlet 37 to the wet inlet 32 to expel moisture absorbed when air passes through the dryer from the wet inlet to the dry inlet from the compressor 29 to the reservoir 39.

The datum which determines the steady state ride height setting varies according to the mode selected by the driver using the selector switch unit 77.

Operation of the inhibit switch 79 to select Inhibit On causes a driver's selector signal 76 to maintain a Standard ride height setting at all times. This selection is particularly useful for a vehicle which is towing a trailer where variations in the ride height would affect the attitude of the trailer.

Operation of the inhibit switch 79 to select Inhibit Off causes a driver's selector signal 76 which provides the Standard ride height setting when the vehicle is stationary or is travelling at less than 80 km/hour. If the road speed exceeds 80 km/hour for more than 30 seconds the ECU selects a new datum giving a Low Profile ride height, 20 mm below the Standard. On a vehicle having a steered rigid front axle as shown and torque arms which are fixed to the axle and pivot on the chassis to the rear of the axle, this lowering increases the castor angle of the steering and hence assists stability. The ECU reselects the Standard ride height setting if the road speed falls below 56 km/hour for more than 30 seconds, or if Inhibit On is selected using inhibit switch 79.

Operation of the up switch 78 (with the inhibit switch 79 selecting Inhibit Off) provides a driver's selector signal 76 which causes the ECU to select a new datum which gives a High Profile ride height setting, 40 mm above the Standard ride height. The ECU inhibits the selection of the new datum if the road speed is in excess of 56 km/hour and if the road speed reaches this value causes reversion to the Standard ride height setting.

Operation of the down switch 80 when the vehicle is operating in the High Profile ride height setting causes reversion to the Standard ride height. However, when the vehicle is already in the Standard ride height setting, operation of the Down switch (with the inhibit switch 79 selecting Inhibit Off) provides a driver's selector signal 76 which causes the ECU to select a new datum which gives a Kneel ride height setting, 60 mm below the Standard ride height.

The ECU 27 causes the selection of the Kneel ride height setting only if the vehicle is stationary, as indicated by the road speed signal 72. In addition a door open signal 75 causes the ECU to prevent alteration of the ride height from the Standard to the Kneel setting, thus helping to prevent a door lodging on an article or object on the ground, eg a low wall. If a door is opened during a height change, the height changes are prevented until the door is shut when the height change is resumed.

The Park signal 73 is used by the ECU to prevent movement to the Kneel setting except when the handbrake is applied or the automatic transmission is in the Park position. Similarly, the Engine Speed Signal 71 is used to prevent movement to the Kneel setting except when the engine is running or up to 20 seconds after the engine has stopped.

The Park signal 73 is also used by the ECU to provide a levelling operation, if required, at timed intervals of 5 hours. This brings the level to that of the lowest corner and compensates for leakages and changes in ambient temperature.

The ECU causes the ride height setting to revert to Standard from the Kneel setting if either the up switch 78 or the inhibit switch 79 is selected or if the handbrake is released (or the transmission is moved from Park). Furthermore, if a Road Speed signal 72 is received, the ECU reverts the ride height setting to Standard to prevent damage to the vehicle caused by an abnormally low ride height.

When the ride height is being adjusted from a lower setting to a higher setting, ie from Kneel to Standard, from Low Profile to Standard or from Standard to High Profile, the ECU adjusts the ride height from the lower setting to the higher setting at the rear suspension before adjusting at the front suspension. This helps to prevent dazzle from the vehicle's headlights. Similarly, when the ride height is being adjusted from a higher setting to a lower setting, eg from Standard to Low Profile or from High Profile to Standard, the ECU adjusts the ride height from the higher setting to the lower setting at the front before adjusting at the rear. However, for speed of operation, the adjustment from Standard to Kneel is made with all ride height valves opened together.

To reduce the amount of pitch made by the vehicle when the suspension is adjusted from a lower setting to a higher setting, the ECU adjusts the ride height to a first intermediate setting of 70 percent of the required suspension movement, whilst maintaining the same sequence of movement as described above. Thus, for example, in moving from the Kneel setting to the Standard setting, requiring a height difference of 60 mm, the rear suspension is raised by 43 mm followed by the front suspension by the same amount. Then the rear suspension is raised a further 18 mm followed by the front suspension of the same amount.

Similarly, when the suspension is adjusted from a higher setting to a lower setting, the ECU adjusts the ride height to a second intermediate setting of 70 percent of the required suspension movement whilst again maintaining the same sequence of movement, the adjustment from Standard to Kneel being an exception, as described above.

Because the footbrake or service brake works on all four wheels 11, 12, 13 and 14 of the vehicle, the Footbrake Signal 74 is used by the ECU to suspend operation of the levelling system if the road speed is below 1.6 km/hour. This prevents any sudden suspension movements occurring when the footbrake is released.

The Footbrake Signal 74 is also used at road speeds above 8 km/hour to suspend levelling so that weight transfer effects are ignored. Inhibiting the effect of the Footbrake Signal between 1.6 and 8 km/hour allows the suspension to move from the Kneel to the Standard setting whilst the vehicle is being manoeuvred (eg from a parking place).

The Engine Speed signal 71 is used to ensure that suspension levelling normally occurs only when the engine is running. This helps to prevent any safety problems if the buttons of the selector switch umit 77 are tampered with or accidentally touched when the vehicle is stationary. It also helps to ensure that there is no battery drain due to excessive use of the compressor. However, the ECU remains operative by a delay unit (conveniently a power supply from an interior light delay unit) for 20 seconds after all doors have been shut to allow the vehicle to self level to the height of the lowest corner and to allow operation to the Kneel setting.

Under extreme conditions of off-road travel or if very deep snow is encountered the vehicle may experience a phenomenon conveniently referred to as "belly-out" where the vehicle is partly supported by direct contact between the chassis 21 and a ground obstacle, i.e. by means other than the road wheels. The normal reaction of the ECU 27 is to reduce pressure in the air springs 15, 16, 17 and 18 in an attempt to restore the selected ride height, which exacerbates the problem and can make the vehicle immobile.

If the up switch 78 has already been selected to give the High Profile ride height setting or if this fails to overcome the problem, the ECU monitors the operation of the ride height valves so that if a down signal exists for more than a predetermined time (7 seconds) the valves are shut off to save air in the reservoir. At the same time a warning light is flashed.

The ECU 27 then checks the height sensor signals 82, 83, 84 and 85 and opens the inlet valve 43 and the appropriate ride height valve 51, 52, 53 or 54 to cause air to be re-admitted to the air spring associated with the lowest ride height for a fixed period of 2 seconds. Following this, the ECU momentarily interconnects the air springs in a predetermined sequence to balance pressures.

The predetermined sequence is to momentarily open ride height valves 51 and 52 to interconnect the front air springs 15 and 16, to momentarily open ride height valves 53 and 54 to interconnect the rear air springs 17 and 18, to momentarily open ride height valves 51 and 54 to interconnect a front air spring 15 on one side of the vehicle and a rear air spring 18 on the other side of the vehicle and to momentarily open ride height valves 52 and 53 to interconnect the front air spring 16 on the other side of the vehicle and the rear air spring 17 on the one side.

Following the interconnection sequence just described, the ECU 27 is inhibited from sending further up and down signals to open the ride height valves 51, 52, 53 and 54 until the inhibit switch 79 or the down switch 80 on the selector switch unit 77 is pressed or until the road speed signal 72 indicates a road speed in excess of 56 km/hour. The ECU is also arranged to revert to normal operation of the ride height valves after a predetermined time.

The ECU 27 includes an on board diagnostics system which checks that the height sensor signals 82, 83, 84 and 85 are within operational limits, that the engine speed and vehicle speed signals 71 and 72 are not open circuit and within limits of rate of change. The ECU also checks for a stuck pressure switch 47, failure of the compressor 29, air leakage and for correct valve functioning.

If the failure mode is minor, i.e. height control is maintainable, warning lights are flashed (eg an up light and a down light which normally illuminate with operation of the up and down switches 78 and 80) and the system reverts to the Standard ride height as if Inhibit was in operation.

If a failure occurs when the ride height is below Standard and cannot be restored to Standard, the system remains at the same ride height. If there are more than two failures or the ride height is stuck above Standard and cannot be returned to Standard reliably, then the system is deflated and the suspension is supported on bump stops.

If any one front height sensor signal 82 or 83 is lost, then the other signal is used to judge deviation from the datum. Similarly if any one rear height sensor signal 84 or 85 is lost then the other signal is used.

Although the suspension system has been described with particular reference to a four wheel vehicle with rigid axles, the invention is applicable to vehicles with additional axles or with independent suspension. Similarly the invention is applicable where liquid, e.g. hydraulic oil, is used to provide adjustment for ride height and a fixed mass of gas provides the springing medium or where mechanical ride height adjustment is provided.

We claim:

1. A suspension system for a vehicle having front wheels and rear wheels, the suspension system comprising front suspension units for supporting vehicle weight on the front wheels and rear suspension units for supporting vehicle weight on the rear wheels, the suspension units being operative to adjust the ride height between sprung and unsprung parts of the vehicle, control means operatively connected to the suspension units for maintaining the ride height at a first, Standard, setting for normal driving on a road and driver operable selector means for providing a driver's selector signal for varying operation of the control means to alter the ride height to a second, Kneel, setting below the Standard setting, the control means being responsive to a door open signal indicative of the opening of an outwardly opening door of the vehicle to interrupt alteration of the ride height to or from the Kneel setting when the door is opened.

2. A suspension system according to claim 1 wherein the control means is responsive to a road speed signal indicative of the speed of the vehicle to prevent alteration of the ride height to the Kneel setting in response to a driver's selector signal except when the vehicle is stationary.

3. A suspension system according to claim 1 wherein the control means is responsive to an engine off signal indicative that the engine of the vehicle is not running to prevent alteration of the ride height to the Kneel setting except when the engine is running.

4. A suspension system according to claim 3 wherein the control means is operative to permit alteration of the ride height to the Kneel setting for a predetermined time after the engine has been switched off.

5. A suspension system according to claim 1 wherein the control means is operative to restore the ride height to the Standard setting in response to a road speed signal indicating vehicle movement following operation of the selector means to select the Kneel setting.

6. A suspension system for a vehicle having front wheels and rear wheels, the suspension system comprising front suspension units for supporting vehicle weight on the front wheels and rear suspension units for supporting vehicle weight on the rear wheels, the suspension units being operative to adjust the ride height between sprung and unsprung parts of the vehicle, control means operatively connected to the suspension units for maintaining the ride height at a first, Standard, setting for normal driving on a road and driver operable outwardly opening door of the vehicle to interrupt alteration of the ride height to or from the Kneel setting when the door is opened and to a footbrake on signal indicative that a footbrake on the vehicle is applied to prevent alteration of the ride height to the Kneel setting except when the footbrake is not applied.

7. A suspension system according to claim 6 wherein the control means is operative to restore the ride height to the Standard setting in response to the absence of a park signal indicating that the parking device is released.

8. A suspension system for a vehicle having front wheels and rear wheels, the suspension system comprising front suspension units for supporting vehicle weight on the front wheels and rear suspension units for supporting vehicle weight on the rear wheels, the suspension units being operative to adjust the ride height between sprung and unsprung parts of the vehicle, control means operatively connected to the suspension units for maintaining the ride height at a first, Standard, setting for normal driving on a road and driver operable selector means for providing a driver's selector signal for varying operation of the control means to alter the ride height to a second, Kneel, setting below the Standard setting, the control means being responsive to a door open signal indicative of the opening of a control means, wherein the control means is arranged so that, following interconnection of the suspension units in said predetermined sequence, up and down signals are inhibited until a driver's selector signal is received.

9. A suspension system for a vehicle having front wheels and rear wheels, the suspension system comprising front suspension units for supporting vehicle weight on the front wheels and rear suspension units for supporting vehicle weight on the rear wheels, the suspension units being operative to adjust the ride height between sprung and unsprung parts of the vehicle, and control means operatively connected to the suspension units for maintaining the ride height at a first, lower, setting or a second, higher, setting above the first setting in response to vehicle parameters or driver command, the control means being operative to adjust the ride height from the lower setting to the higher setting at the rear suspension units before adjusting at the front suspension units, to adjust from the higher setting to the lower setting at the front suspension units before adjusting at the rear suspension units, to adjust the ride height to a first intermediate setting between the lower setting and the higher setting when adjusting the ride height from the lower setting to the higher setting and to adjust the ride height to a second intermediate setting between the higher setting and the lower setting when adjusting the ride height from the higher setting to the lower setting.

10. A suspension system according to claim 9 wherein the control means is operative to adjust the ride height from the first intermediate setting to the higher setting at the rear suspension units before adjusting at the front suspension units and to adjust from the second intermediate setting to the lower setting at the front suspension units before adjusting at the rear suspension units.

11. A suspension system for a vehicle having front wheels and rear wheels, the suspension system comprising front suspension units for supporting vehicle weight on the front wheels and rear suspension units for supporting vehicle weight on the rear wheels, each suspension unit being operative to adjust the ride height between sprung and unsprung parts of the vehicle adjacent to each suspension unit, and control means operatively connected to the suspension units for maintaining each ride height at a particular setting, the control means being adapted to provide for each suspension unit a respective up signal tending to increase the ride height and a respective down signal tending to reduce the ride height and arranged so that if a down signal exists for more than a predetermined time indicative that the vehicle is supported by means other than the road wheels the down signal is ceased.

12. A suspension system according to claim 11 wherein the control means is arranged to provide an up signal following cessation of the down signal, said up signal tending to increase the ride height at the suspension unit associated with the lowest ride height.

13. A suspension system according to claim 12 wherein the control means is arranged to provide the up signal for a fixed period following cessation of the down signal.

14. A suspension system according to claim 12 in which the suspension units use fluid pressure to support the vehicle and wherein the control means is arranged to momentarily interconnect the suspension units in a predetermined sequence to balance pressures following the re-admittance of fluid to the suspension unit associated with the lowest ride height.

15. A suspension system according to claim 14 wherein the predetermined sequence comprises momentarily interconnecting the front suspension units, momentarily interconnecting the rear suspension units, momentarily interconnecting a front suspension unit on one side of the vehicle and a rear suspension unit on the other side of the vehicle and momentarily interconnecting a front suspension unit on said other side of the vehicle with a rear suspension unit on said one side of the vehicle.

16. A suspension system according to claim 14 and further comprising driver operable selector means for providing a driver's selector signal for varying operation of the control means, wherein the control means is arranged so that, following interconnection of the suspension units in said predetermined sequence, up and down signals are inhibited until a driver's selector signal is received.

17. A suspension system according to claim 14 wherein the control means is responsive to a road speed signal indicative of the speed of the vehicle and, following interconnection of the suspension units in said predetermined sequence, is operative to inhibit up and down signals until the road speed signal indicates that a predetermined road speed is attained.

18. A suspension system according to claim 14 wherein the control means is arranged so that, following interconnection of the suspension units in said predetermined sequence, up and down signals are inhibited until a predetermined time has elapsed.

* * * * *